United States Patent [19]

Blau et al.

[11] Patent Number: 4,807,714
[45] Date of Patent: Feb. 28, 1989

[54] HITCH ASSEMBLY AND METHOD

[75] Inventors: Andrew P. Blau, Willoughby Hills; Joseph A. Masso, Westlake, both of Ohio

[73] Assignee: Caterpillar Industrial Inc., Mentor, Ohio

[21] Appl. No.: 86,743

[22] Filed: Aug. 18, 1987

[51] Int. Cl.$^4$ .......................... B60D 1/10; B62D 1/24
[52] U.S. Cl. ..................................... 180/168; 172/326; 280/475; 280/477; 280/490.1; 280/425.1; 280/479.1
[58] Field of Search ........... 280/479 R, 479 A, 490 R, 280/425 R, 477, 475; 180/168; 172/326

[56] References Cited

U.S. PATENT DOCUMENTS

| | | | |
|---|---|---|---|
| 2,844,390 | 11/1956 | Smith | 280/477 |
| 3,150,609 | 9/1964 | Bradt | 104/172.2 |
| 3,319,977 | 5/1967 | Quandt et al. | 280/475 |
| 3,412,489 | 9/1966 | Klapprodt et al. | 37/231 |
| 3,489,432 | 1/1970 | Karlstrom | 280/479 R X |
| 3,554,578 | 1/1971 | Reed | 280/490 R |
| 3,667,564 | 6/1972 | Schnell | 180/168 |
| 4,131,295 | 12/1978 | Highberger | 280/475 |
| 4,368,899 | 1/1983 | Smalley et al. | 280/477 |

FOREIGN PATENT DOCUMENTS

| | | |
|---|---|---|
| 0235094 | 9/1987 | European Pat. Off. . |
| 1059297 | 6/1959 | Fed. Rep. of Germany . |
| 972718 | 8/1950 | France ............................. 280/490 R |
| 8101391 | 5/1981 | PCT Int'l Appl. . |
| 729646 | 5/1955 | United Kingdom ................ 280/477 |

OTHER PUBLICATIONS

Brochure of Caterpillar Industrial Inc., published Apr., 1986, "The New Dimension in Automated Material Handling", (8 pages).
A Material Handling Institute (MHI) brochure, reprinted publication, dated Apr., 1983, entitled "AGVS", (40 pages).
Publication of Volvo, entitled "Autocarrier... How It Works", copyright 1985, (24 pages).

Primary Examiner—David M. Mitchell
Assistant Examiner—Mitchell J. Hill
Attorney, Agent, or Firm—Alan J. Hickman

[57] ABSTRACT

A hitch assembly and method for connecting a vehicle to a towed apparatus and releasing the towed apparatus from connection to the underlying supporting surface has a tongue which is connected to the towed apparatus and a socket engaging device mounted on the vehicle. The socket engaging device is movable from a first position at which the tongue is free from connection to the vehicle to a second position elevationally spaced from the first position at which the tongue is connected to the socket engaging device. An actuator which is mounted on the vehicle and connected to the socket engaging device elevationally moves the socket engaging device between the first and second positions. A tongue supporting member is movable from a surface supported position to a socket engaging device supported position spaced from the underlying surface in response to movement of the socket engaging device from the first position to the second position. The hitch assembly is particularly suited for connecting an automatic guided vehicle to a trailer.

24 Claims, 7 Drawing Sheets

HITCH ASSEMBLY AND METHOD

DESCRIPTION

1. Technical Field

This invention relates to a hitch assembly and method of connecting a towed apparatus to a vehicle, and more particularly to a trailer having a tongue, a socket member and a tongue supporting member, and a vehicle having a socket engaging device which is elevationally movable for connecting the socket member to the vehicle and raising the tongue supporting member from a tongue supporting position.

2. Background Art

Hitch assemblies for connecting a drawn member, for example, a trailer, implement, and the like to a vehicle, for example, a driverless automatic guided vehicle, a tow vehicle, tractor, and the like have been known for some time. An example of a hitch for connecting an implement to a farm tractor is disclosed in U.S. Pat No. 2,844,390, dated July 22, 1958 to L. L. Smith. This patent teaches a connecting member mounted on the implement and a hitch mounted on the tractor. The connecting member has an integral coupling ring and a leg which is pivotally mounted to the connecting member. The leg being pivotally mounted on the connecting member enables the leg to be moved from a ground engaging position to a position at which the leg is free from engagement with the ground. This hitch includes a pin which is elevationally moveable in a downward direction to impale the coupling ring which couples the implement to the tractor. The pin is spring biased in the downward direction and moves downwardly in response to release of a pin lock. The hitch also has upper and lower guide ramps which are flared rearwardly and outwardly to aid in positioning of the coupling ring relative to the pin so that alignment between the two may be achieved. Movement of the coupling ring relative to the pin in a direction toward the pin results in engagement between the lower ramp and the leg. Continuous movement of the coupling in a direction toward the ramp will result in pivotal movement of the leg and disengagement of the leg from the ground. The hitch of the above mentioned patent discloses several problems which this invention is intended to overcome in a simple and economical manner.

One problem is related to pivotal movement of the leg. In order for the connecting member to be aligned with the pin, the leg must be forced by the lower guide ramp to pivot away from engagement with the ground to an elevated position. Friction forces between the ground and the leg may be higher than the forces required to move the implement which will result in rolling of the implement and forcing the leg to pivot in the wrong direction. This, of course, would over stress the leg and cause bending of the leg and failure of the pivot joint between the leg and the connecting member. Also, this excessive force would result in damage to the lower guide ramp. Also, if the leg should extend a distance beneath the upper surface of the ground and became caught the potential for failure of the leg due to over stressing is an even greater possibility.

As the coupling ring moves toward the pin and the leg pivots away from an upright supporting position, the coupling ring will lower into engagement with the lower ramp. As a result, the coupling ring will be supported on the ramp and the entire tongue weight of the towed apparatus will be transferred to the ramp. In order for the coupling ring to be moved into alignment with the pin, the ring will have to slide along the ramp a substantial distance. This sliding movement will cause premature wear of the ramp and coupling ring which will eventually result in premature failure of one or the other. Therefore, it would be advantageous to eliminate this tongue weight carrying sliding motion during coupling ring alignment.

Because the pin is biased by a spring in a downward direction to engage the coupling ring, there is a potential for failure of the spring which would result in an inability to positively retain the pin in engagement with the coupling ring which would result in inadvertent release of the toward implement from connection to the trailer. This is especially true in applications where the underlying terrain is rough and escessive bouncing and pitching of the vehicle and implement occur. Therefore, it would be advantageous to provide a hitch which was positive and did not rely on springs to maintain the hitch in the ring engaged position.

Further, the pin of the subject patent utilizes a cam which is manually actuated to release the pin from connection with the coupling ring and to reset a latch to retain the pin in the raised and unconnected position. Therefore, manpower must be available and on hand each time the towed apparatus is to be released from connectio+n with the tractor. This, of course, is costly and a waste of human resources.

U.S. Pat. No. 4,368,899, dated Jan. 18, 1983 to Edward A. Smally et al discloses an automatic hitch mechanism which permits powered actuation of a pivotally mounted hook member which permits coupling and uncoupling of the hook member with a towed implement. Since the hook member pivots in order to engage the latch ring mounted on the implement, undesirable translation of the implement along the ground will take place which is not acceptable in industrial applications where accurate positioning of the towed trailer and the like is required.

The present invention is directed to overcoming one or more of the problems as set forth above.

DISCLOSURE OF THE INVENTION

In one aspect of the present invention, a hitch assembly for connecting a vehicle to a towed apparatus supported on an underlying supporting surface is provided. A tongue having first and second spaced apart end portion is adapted for connection at the first end portion to one of the towed apparatus and vehicle and at the second end portion to a socket member. A tongue supporting member having spaced apart mounting and piloting end portions is connected at the mounting end portion to the tongue and extends in an elevationally transverse direction relative to the tongue. A socket engaging device is mounted on a bracket which is mountable on the other of the vehicle and towed apparatus. The socket engaging device is moveable between a first position, at which the socket member is free from connection with the socket engaging device, and a second position, at which the socket member is engaged with and connected to the socket engaging device. An actuator having a housing which is connected to one of the bracket and socket engaging device and an output member which is connected to the other of the bracket and socket engaging device is provided to elevationally move the socket engaging device between the first and second positions. The tongue is elevationally moveable from a surface supported position, at which the piloting end portion of the tongue supporting member is engageable with the underlying supporting surface, to a socket engaging device supported position elevationally spaced from the surface supported position, at which the piloting end portion of the tongue supporting member is spaced from the underlying supporting surface, in response to elevational movement of the socket engaging device from the first position toward the second position.

In another aspect of the present invention a trailer and tow vehicle is provided. A tongue having first and second end portions is connected at the second end portion to a socket member having an opening. A mounting device is provided for connecting the tongue first end portion to the trailer. A tongue supporting member having a connecting end portion and a piloting end portion is connected at the connecting end portion to the tongue and extends in a direction transverse to the tongue and downward towards an underlying supporting surface. A bracket having first flange member is connected to one of a first and a second end portion of a frame of the vehicle. A socket engaging device having a hooking member and a guide is connected to the bracket. The guide defines a preselected elevationally oriented guide path and the hooking member is slideably connected to the guide and moveable relative to the bracket along the guide path. A power device is provided for moving the hooking member elevationally along the guide path between a first position, at which the hooking member is spaced at preselected elevational distance from the first flange member, and a second position spaced from the first position, at which the hooking member is closely adjacent the first flange member. The tongue is elevationally moveable from a surface supported position, at which the piloting end portion is engaged with the underlying supporting surface and the hooking member is free from engagement with the socket member, to a socket engaging device supported position, at which the piloting end portion is spaced from the underlying supporting surface and the hooking member is disposed in the socket member opening, in response to elevational movement of the hooking member from the first position to the second position. The socket member is disposed between and engaged with the first flange and hooking members at the second position of the hooking member.

In another aspect of the present invention, an industrial transport system having a driverless automatic guided computer controlled vehicle is provided. The automatic guided vehicle has a frame and a plurality of wheels rotatably connected to the frame and engaged with an underlying supporting surface. An industrial trailer having a trailer frame and a plurality of wheels rotatably connected to the trailer frame is supported on the underlying supporting surface. The underlying supporting surface has a plurality of spaced apart pilot apertures which define a plurality of docking locations. A tongue having first and second spaced apart end portions is connected at the first end portion to the industrial trailer and at the second end portion to a socket member. A tongue supporting member having a connecting end portion and a piloting end portion is connected at the connecting end portion to the tongue at a location on the tongue between the first and second end portions. The tongue supporting member extends in a direction substantially normal to the tongue and dowwnard to the underlying supporting surface. The piloting end portion is disposed in one of the plurality of pilot apertures. A socket engaging device having a guide is connected to the vehicle frame. The guide defines a guide path and the socket engaging device is elevationally movable along the guide path between a first position, at which the socket member is elevationally spaced above the socket engaging device, in the guide path, and free from connection with the socket engaging device, and a second position elevationally spaced above the first position, at which the socket engaging device is engaged with the socket member and connected to the socket member. A power device is provided for elevationally moving the socket engaging device along the guide path and between the first and second positions. The tongue supporting member is elevationally movable in response to elevational movement of the socket engaging device and the tongue supporting member is disposed in one of the plurality of pilot apertures at the first position of the socket engaging device and elevationally spaced from being disposed in the one pilot aperture at the second position of the socket engaging device.

The method of an embodiment of the present invention includes the steps of positioning the industrial vehicle at a location adjacent the industrial trailer, at which a socket engaging device of the industrial vehicle at disposed at a first position elevationally beneath a socket member of the industrial trailer and within a path of elevational mvoement of the socket engaging device. Actuating a power means connected to the socket engaging device and elevationally moving the socket engaging device along the path of elevational movement from a first position, at which the socket engaging device is free from connecton with the socket member, to a second position elevationally spaced from the first position, at which the socket engaging device is connected to the socket member. Lifting a piloting end portion of an industrial trailer mounted tongue supporting member from a surface supported position, at which the pilot end portion is disposed in a pilot aperture of an underlying supporting surface, to a vehicle supported position, at which the piloting end portion is free from being disposed in said piloting aperture, in response to elevational movement of the socket engaging member from the first position towards the second position.

BRIEF DESCRIPTION OF THE DRAWINGS

FIG. 5 is a diagrammatic side elevational view of a alternate embodiment of the hitch assembly of FIG. 1 showing the tongue at a first position at which the socket engaging member is free from connection with the socket and the tongue supporting member is disposed in the pilot bore of the underlying supporting surface;

Figure 5:
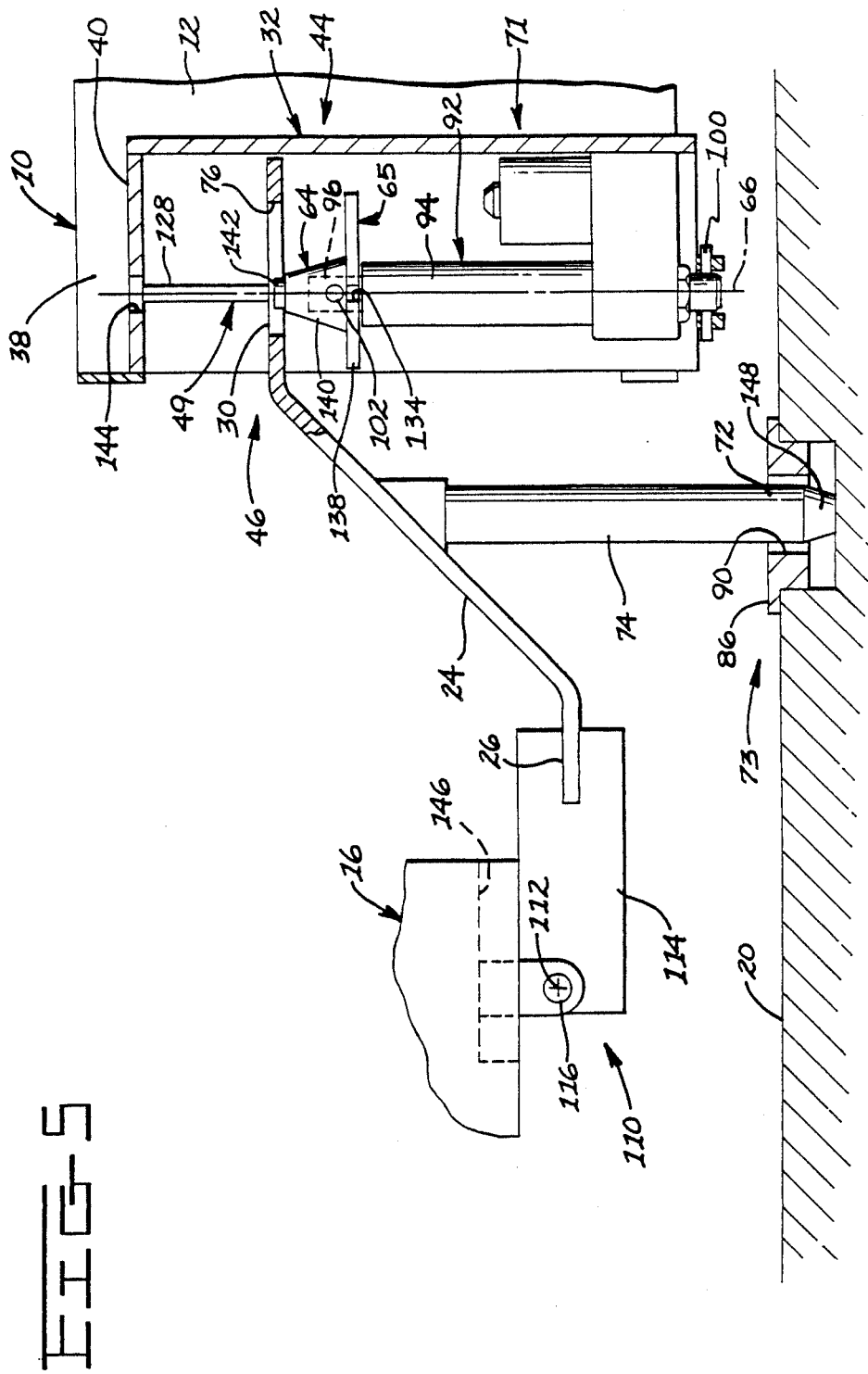
Figure 6:
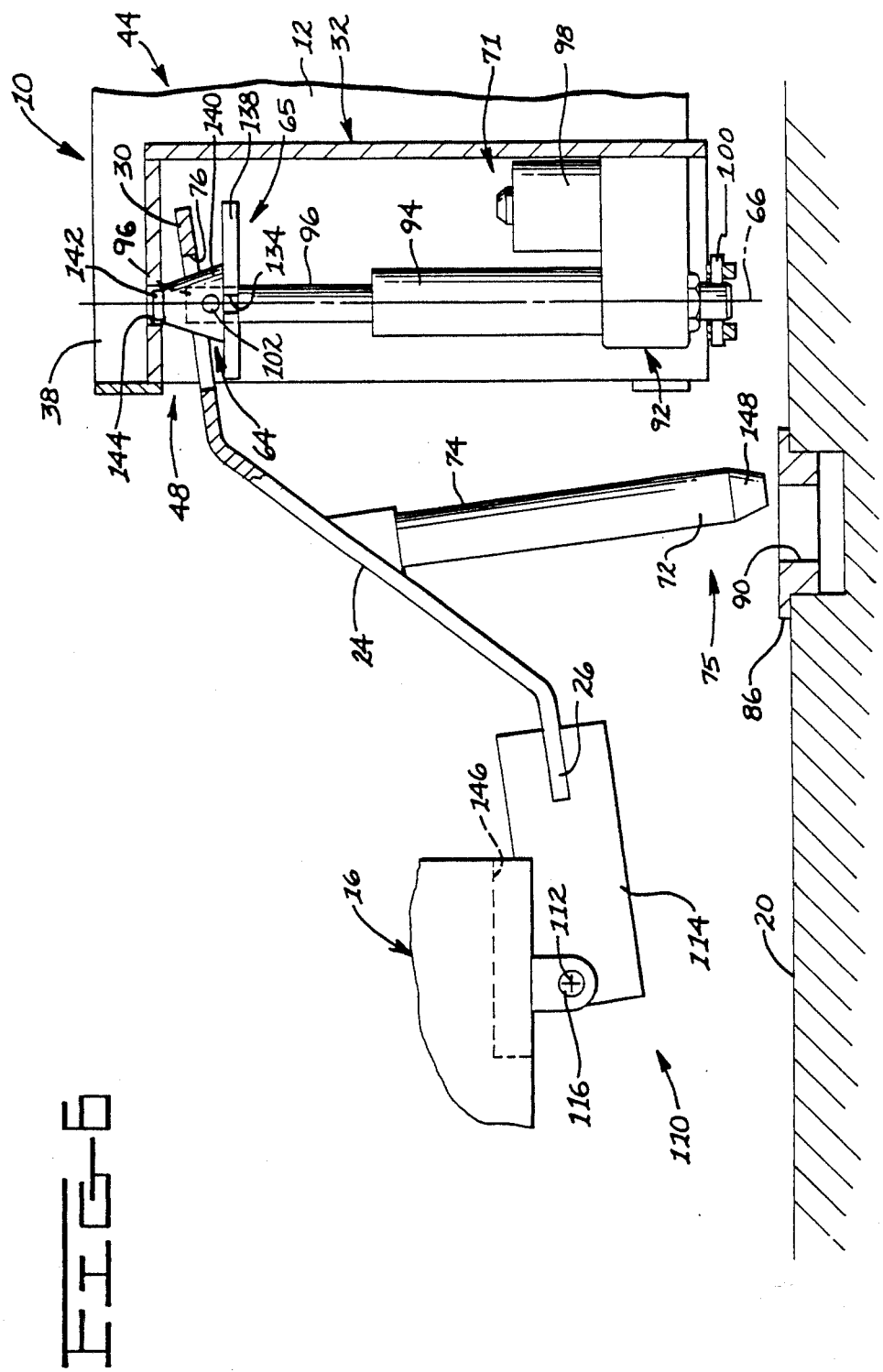
Figure 7:
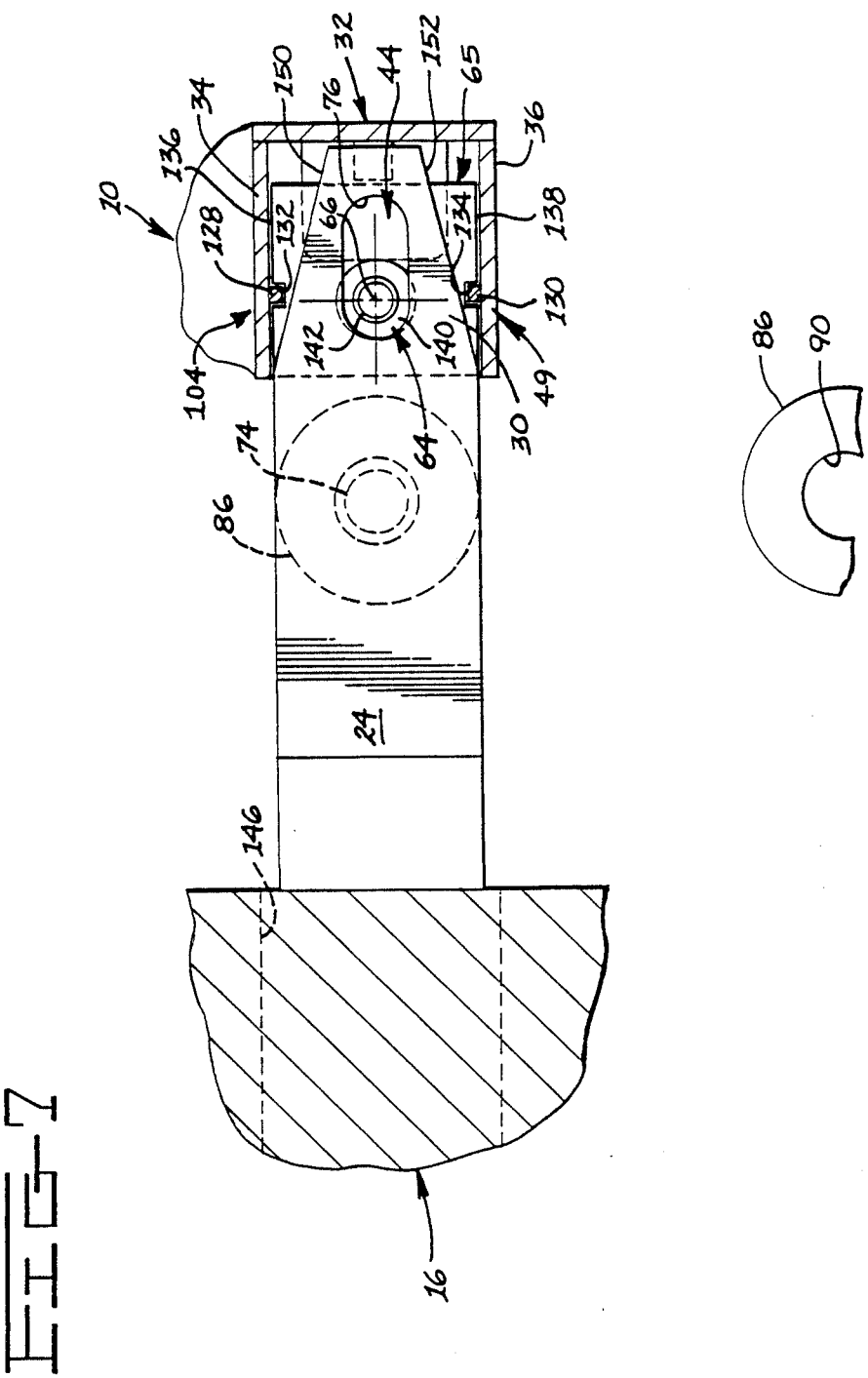

FIG. 6 is a diagrammatic side elevational view of the alternate embodiment of FIG. 5 showing the socket engaging member disposed in connection with the socket member and the tongue supporting member elevationally spaced from being disposed in the pilot bore of the underlying support surface; and FIG. 7 is a top elevational view of the alternate embodiment of FIG. 5 showing the construction of the hitch assembly in greater detail.

BEST MODE FOR CARRYING OUT THE INVENTION

Figure 1:
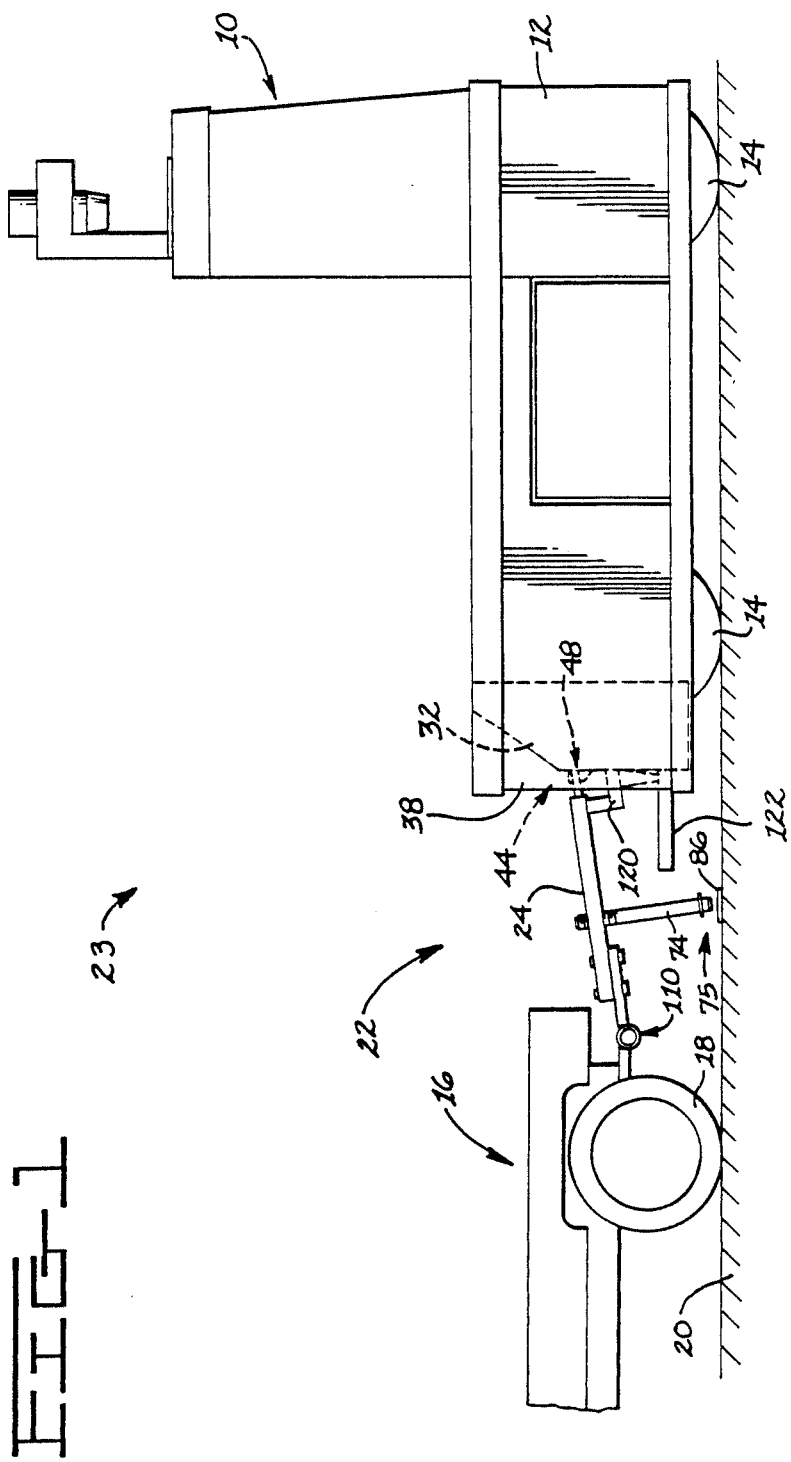
FIG. 1 is a diagrammatic side elevational view of an embodiment of the present invention showing a vehicle connected to a towed apparatus by a hitch assembly.

With reference to the drawings, and particularly FIG. 1, a vehicle 10 having a frame 12 and a plurality of wheels 14 rotatably connected to frame 12 is provided for towing a towed apparatus 16 having a plurality of rotatably mounted wheels 18 (only one shown) over an underlying supporting surface 20. The vehicle 10 is preferably a driverless automatic guided computer controlled vehicle 10 which has free ranging capabilities. However, other types of vehicles, for example, tuggers, tractors, fork lifts, and the like which have the ability to tow a payload are contemplated and within the scope of this invention. The towed apparatus 16 is preferably an industrial trailer, however, other types of towed apparatuses, such as, earthworking implements, and the like are contemplated and within the scope of this invention. A hitch assembly 22 is provided for connecting the vehicle 10 to the towed apparatus 16 which is supported on the underlying supporting surface 20. In applications such as industrial transportation systems 23 wherein the vehicle 10 is automatically guided, control devices (not shown) will be provided to sequentially and automatically connect to the trailer 16 to the vehicle 10. In other applications automatic control may not be required. In either automatic or manual vehicle applications the hitch assembly 22 of the subject invention is applicable for use.

Figure 2:
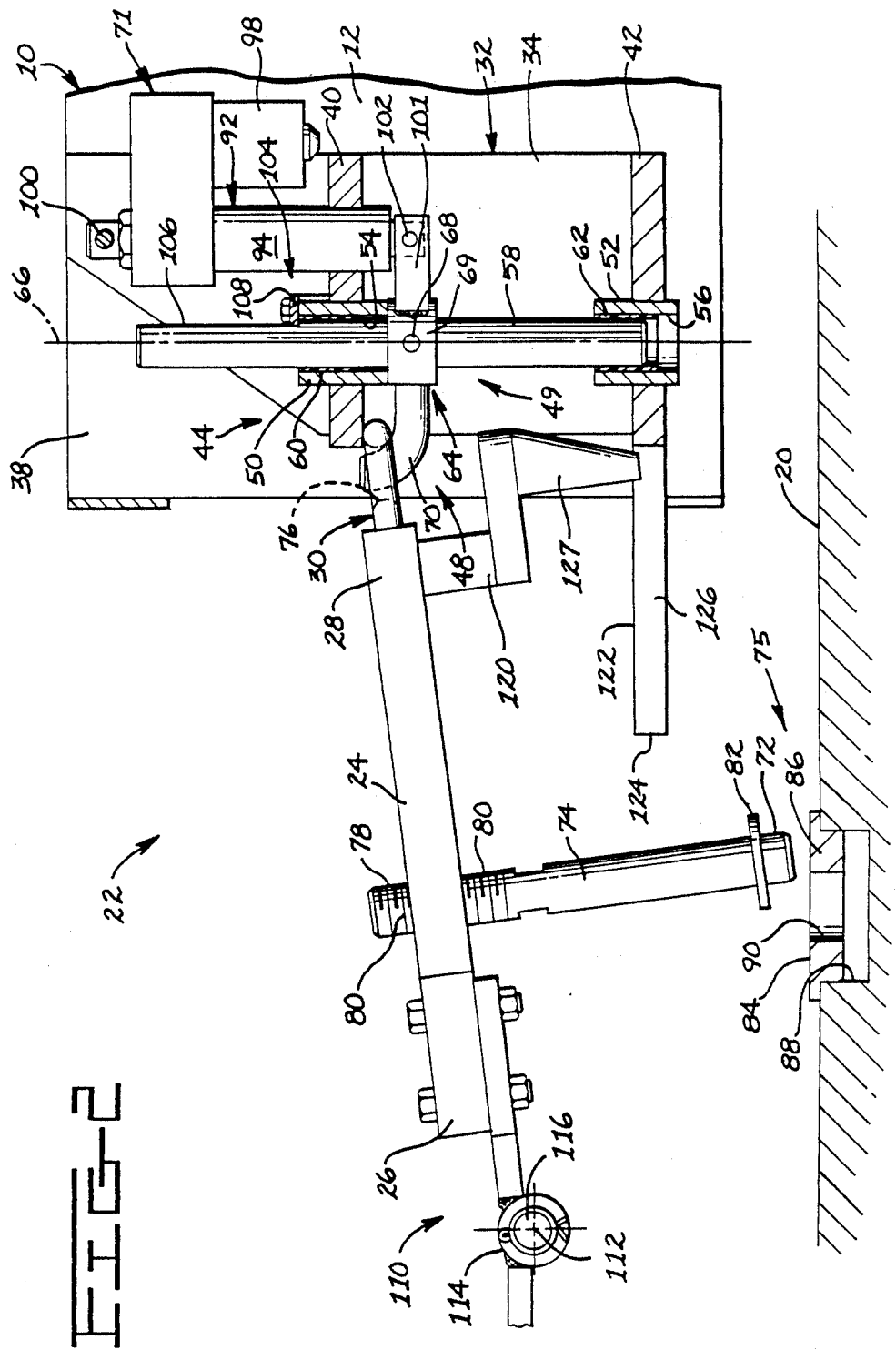
FIG. 2 is a diagrammatic enlarged partial side elevational view of the hitch assembly of FIG. 1 showing the towed apparatus connected tongue in an elevated position, a socket engaging device at a second position at which the socket engaging device is engaged with and connected to a socket member, and a tongue supporting member elevationally spaced from being disposed in a pilot aperture in an underlying supporting surface.
Figure 3:
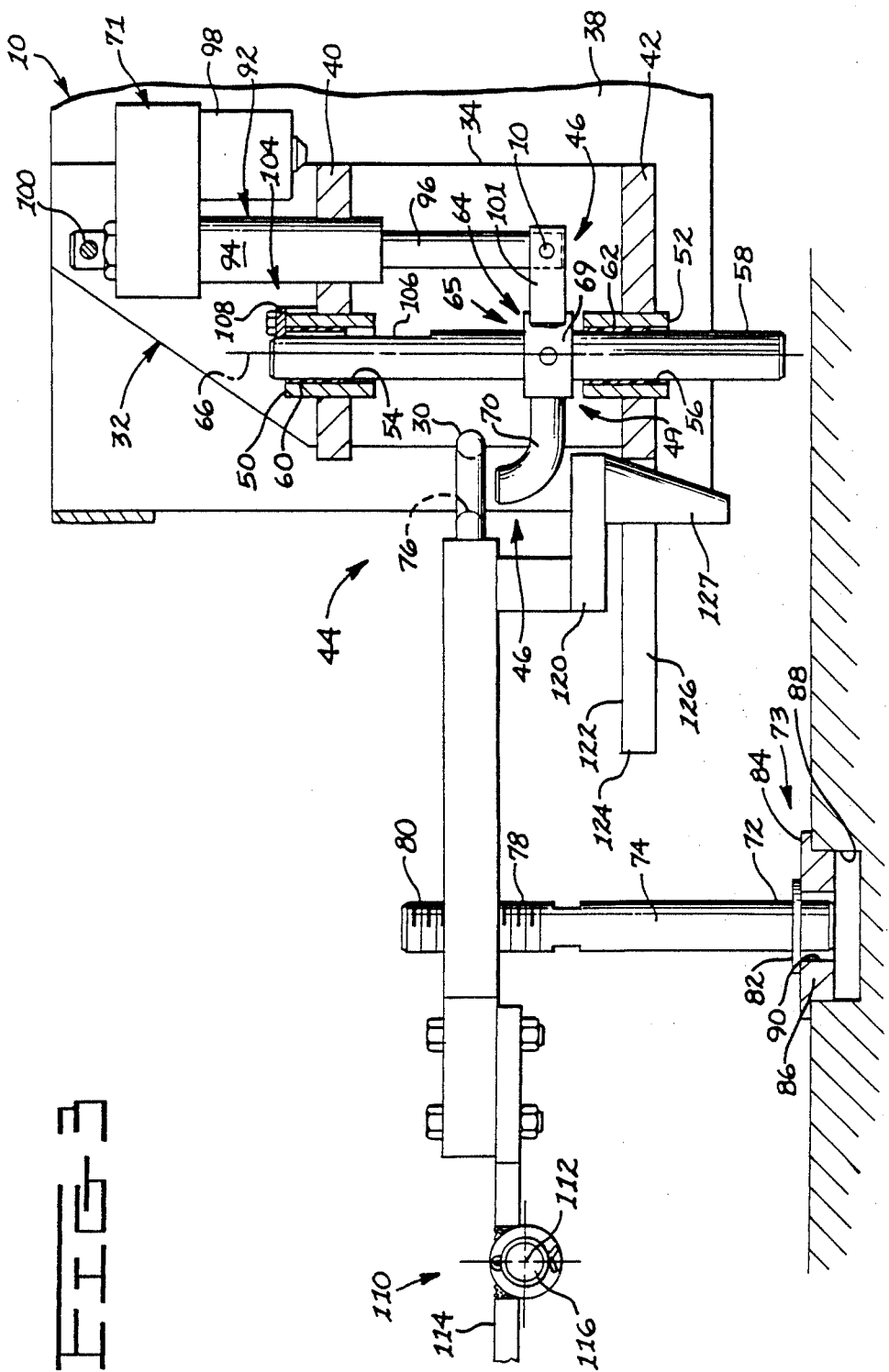
FIG. 3 is a side elevational view of the hitch assembly of FIG. 1 showing the socket engaging member at a first position at which the socket engaging member is free from engagement with the socket member and the tongue supporting member disposed in the pilot aperture of the underlying supporting surface.
Figure 4:
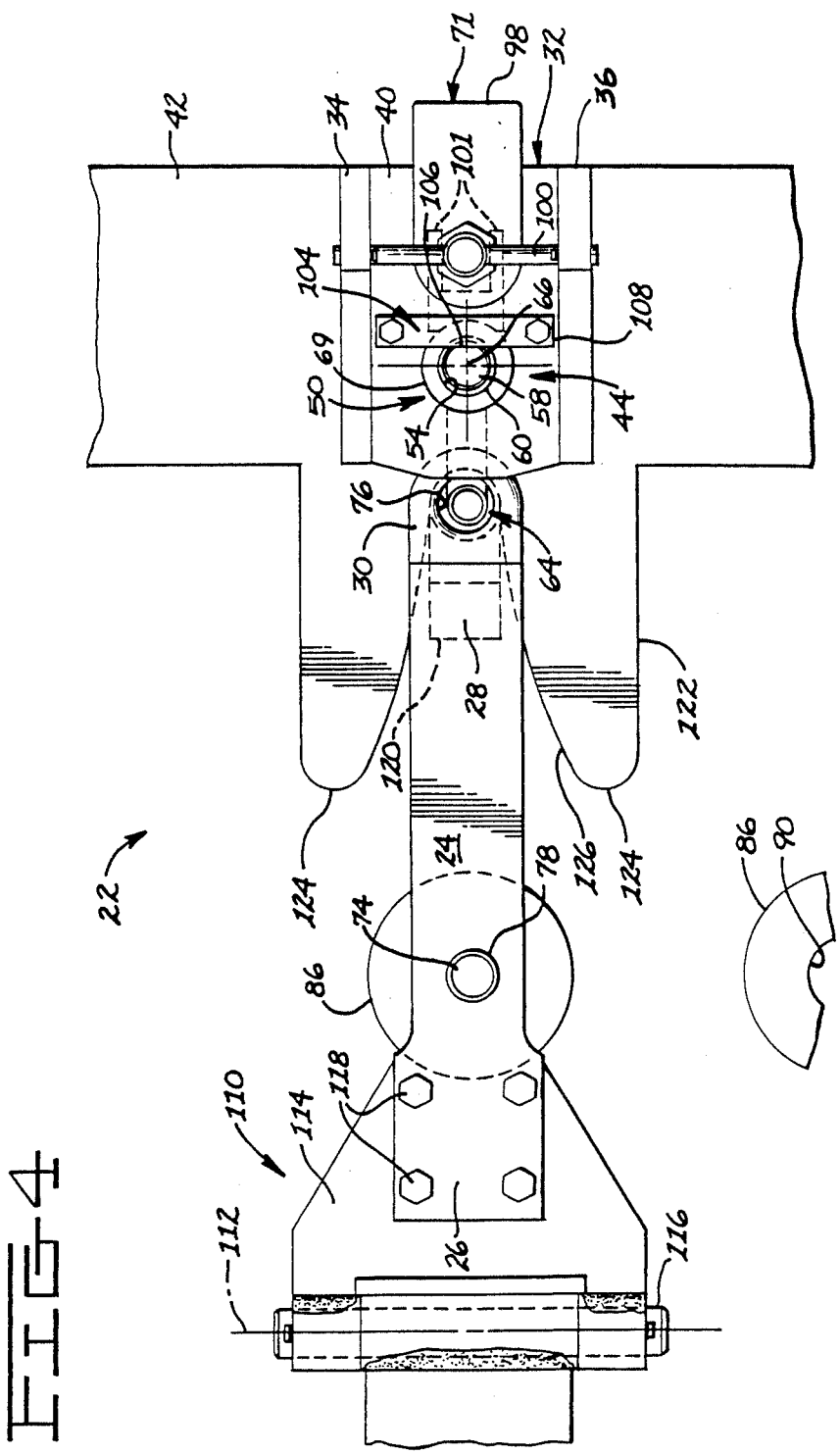
FIG. 4 is a diagrammatic top elevational view of FIG. 3 showing the hitch assembly in greater detail.

Referring to FIGS. 2-4, the preferred embodiment, the hitch assembly 22 has a tongue 24 of an elongate configuration. The tongue 24 has first and second spaced apart end portions 26,28. The first end portion 26 is connected to the trailer 16 and the second end portion 28 is connected to a socket member 30. A bracket 32 having spaced apart sides 34 and 36 is mounted on an end portion 38 of the frame 12. It should be noted that the tongue 24 may be connected to the vehicle and the bracket 32 to the trailer 16 without departing from this invention. The bracket 32 also has first and second substantially parallel spaced apart flange members 40,42 which extend between the first and second side members 34 and 36 of bracket 32 and are connected to the first and second sides 34 and 36 and any suitable manner, such as by welding. The second member 42 preferably extends past the first and second sides 34 and 36 and is fastened at opposite ends to the second end portion 38 of the vehicle frame 12.

A socket engaging device 44 is mounted on the bracket 32 and elevationally movable between a first position 46 (FIG. 3) at which the socket member 30 is free from connection with the socket engaging device 44, and a second position 48 (FIG. 2) elevationally spaced from the first position 46, at which the socket member is engaged with and connected to the socket engaging device 44.

The socket engaging device 44 of the preferred embodiment, as shown in FIGS. 1-4, has a guide 49 which is connected to the bracket 32 and defines an elevationally oriented guide path 66. The guide 49 has first and second sleeves 50,52 which are mounted on the first and second flange members, respectively. The sleeves 50,52 each have a bore 54 disposed therein and are elevationally axially aligned with each other. A hooking member 64 having a guide following portion 65 is connected to the guide 49 and movable along the guide path 66 between the first and second positions 46,48. The guide following portion 65 preferably has a shaft 58 is disposed in the bores 54 and 56 and slideably movable in the bores 54,56. First and second bearings 16 and 62 are disposed in the first and second bores 54 and 56 respectively and serve to freely guide the shaft 58 in the bores 54,56 mounted on the shaft 58 and elevationally moveable along an elevationally oriented guide path 66 defined by the axis of the shaft 58 and the first and second sleeves 50 and 52. The hooking member 64 is preferably connected to the shaft 58 by a pin 68 at an annular body portion 69 of the hooking member 64 which is disposed about the shaft. It should be noted that an alternative construction would include fixed connection of the shaft 58 to the sleeves 50 and 52 and slideable movement of the hooking member 64 and particularly the annular body portion 69 along the shaft 58. THe hooking member 64 is shown as having a upwardly bent end portion 70 extending from the annular body portion 69. The bent end portion is suited for engaging the socket member 30 and capturing the socket member 30 between the bent end portion 70 and the first flange member 40. It is to be emphasized that configuration other than the bent end portion 70 may be utilized for achieving equivalent end results which sandwich the socket member 30 between the bent end portion 70 and the first flange member 40.

A power means 71 is provided for moving the socket engaging device 44 and particularly the hooking member 64 elevationally along the guide path 66 between the first position 46 at which the hooking member 64 is spaced a preselected elevational distance from the first flange member 40 and the second position 48 at which the hooking member 64 is closely adjacent the first flange member 40. The tongue 24 is elevationally movable from a surface supported position 73 (FIG. 3), at which the piloting end portion 72 of a tongue supporting member 74 is engaged with the underlying supporting surface 20 and the hooking member 64 is free from engagement with the socket member 30, to a socket engaging device supported position 75 (FIG. 2), at which the piloting end portion 72 is elevationally spaced from the underlying supporting surface 20 and the hooking member 64 is disposed in an opening 76 in the socket member 30. The tongue 24 is elevationally movable between the surface supported position 73 and the socket engaging device supported position 75 in response to elevational movement of the hooking member between the first position 46 and the second position 46. It is to be noted that the socket member 30 is disposed between and engaged with the first flange member 40 and hooking member 64 at the second position 48 of the hooking member 64.

The tongue supporting member 74 has a connecting end portion 78 which is affixed to the tongue 24 at a location on the tongue 24 preferably between the first and second end portions 26 and 28. The connecting end portion 78 has a plurality of threads 80 disposed thereabout which are screwthreadably connected to the tongue 24. The piloting end portion 72 has an annularly configured stop member 82 mounted thereon. The stop member 82 engages an upper end surface 84 of a locating member 86 disposed in an aperture 88 in supporting surface 20. As best seen in FIG. 3, the piloting end portion 72 is disposed in a pilot aperture 90 in a locating member 86 and the stop member 82 is in contact with the upper surface 84. A plurality of locating members 86 are provided at various spaced apart locations on the supporting surface 20. Each locating member 86 defines a docking location for the trailer 16. It should be recognized that it would be possible to substitute a pilot aperture in the supporting surface 20 and achieve substantially the same end results. The locating member is particularly suited for use in applications wherein the supporting surface 20 is rough, uneven and the like. The locating member 26 provides a higher degree of accuracy and precisely establishes the distance between the support surface 20 and the socket member 30 so that the hooking member 64 may be consistently positioned elevationally beneath the socket member 30.

The power means 71 has an actuator 92 which has a housing 94 and and output member 96 movably connected to the housing 94. The output member 96 preferably includes an elongate rod slideably connected to the housing 94. A motor 98 which is preferably electric is operatively connected to the output member 96 and suitable for moving the output member 96 relative to the housing 94. The actuator housing 94 is pivotally connected to the bracket 32 by pivot pin 100 and the output member 96 is pivotally connected to a bifurcated portion 101 of the hooking member 64 by pivot pin 102. The socket engaging device 44 is elevationally movable between the first and second positions 46 and 48 in response to movement of the actuator output member 96. As previously mentioned, the tongue 24 is elevationally moveable from the surface supported position 73 at which the piloting end portion 72 of the tongue supporting member 74 is engageable with the underlying supporting surface 20 to the socket engaging device supported position 75 elevationally spaced from the surface supported position 73, at which the piloting end portion 72 of the tongue supporting member 74 is spaced from the underlying supporting surface 20.

Means 104 is provided for maintaining the shaft 58 from rotation in the first and second bores 54 and 56. The means 104 includes a flat 106 on the shaft 58 and a stop tab 108 secured to the first sleeve and in slideable engagement with the flat 106. Other configurations, such as a key and key way and the like are to be considered alternative constructions and within the scope of this invention.

Mounting means 110 is provided for pivotally connecting the first end portion 26 of tongue 24 to the towed apparatus 16 and maintaining the tongue 24 for pivotal elevational movement about a first axis 112. The first axis 112 is preferably oriented normal to the guide path 66 and the direction of the extension of the tongue supporting member 74. Therefore, pivotal movement of the tongue 24 about the first axis 112 will lie in a plain passing through the guide path 66. Preferably the mounting means 110 includes a hinge 114 having a hinge pin 116. The hinge 114 is secured to the first end portion 26 of tongue 24 in any suitable fashion, such as by fasteners 118, and to the towed apparatus 16 in any suitable well known manner such as by fasteners.

A tongue piloting projection 120 is connected to the second end portion 26 of tongue 24 and extends from the tongue 24 in a direction substantially elevationally transverse the tongue 24. A tongue guiding member 122 has an end 124 and a slot 126 opening at the end. The tongue guiding member 122 is mounted on the bracket 32 at a preselected elevational distance from the supporting surface 20 so that the tongue guiding member 122 is elevationally aligned to engage the tongue piloting projection 120 when the tongue supporting member 74 is at the surface supported position 73 (FIG. 3). The tongue piloting projection is disposable in the tongue guiding slot 126, slideably engageable with the tongue guiding member 122, and adapted to position the socket member 30 in the guide path 66 and in alignment with the socket engaging device 44 in response to movement of the vehicle 10 in a direction toward the trailer 16. The tongue piloting projection 120 has a tapered end portion 127 and the tongue guiding slot 126 has a V-shaped configuration opening at the end 124 of the tongue guiding member 122. The tapered end portion 127 is slideably engaged with the slot 126 and positions the tongue 24 for alignment purposes with the vehicle 10. The tongue guiding member 122 is preferably an extension of the second flange member 42 and extends in a direction substantially normal to the guide path 66.

Referring to the embodiment of FIGS. 5-7 the guide 49 has first and second spaced apart parallel elevationally oriented guide rails 128,130 which are mounted on the first and second sides 34 and 36, respectively, bracket 36. The first and second guide rails 128,130 of this embodiment defines the elevationally oriented guide path 66 located therebetween. The hooking member 64 has a guide following portion 65 which has first and second opposed spaced apart notches 132,134 disposed therein an opening at opposite sides 136,138 of the guide following portion. The first and second guide rails 128,130 are disposed in the first and second notches 132,134 respectively, and the guide following portion is movably guided along the guide rails 128, 130 between the first and second elevationally spaced apart positions 46,48. In this embodiment the first position of the socket engaging device 44 is established by the housing 94 of actuator 92 and the position of the output member 96 when retracted fully into the housing 94 and the second position 48 of the socket engaging device is established by the first flange member 40. The hooking member 64 of this embodiment has a conically shaped portion 140 which is disposable in the opening 76 of the socket member 30. The tapered (or conical) shape will aid in alignment during engagement with the socket member 30. The hooking member 64 has a cylindrical projection 142 which is disposable in a receiving aperture 144 in the first flange member 40 at the second position 48 of the socket engaging device 44. It is to be noted that the opening 76 is elongated to reduce the accuracy required in mating engagement of the socket member 30 with the socket engaging device 44.

Because hooking member 64 is pivotally connected to the output member 96 by pin 102 adequate surface contact between the guide following portion 65 and the socket member 30 may be achieved. It should be recognized that when the projection 64 is disposed in the receiving aperture 144 the tongue 24 is securely connected to the hooking member 64 which results in positive connection of the towed apparatus 16 to the frame 12 of vehicle 10. It should be noted that the socket member 30 is disposed in a sandwiched fashion between the first flange member 40 and the guide following portion 65 of the hooking member 64 at the second position 46 of the socket engaging device 44.

The first and second guide rails 128 and 130 guides the hooking member 64 and supports the housing 94 output end orientation. This is achieved through pivotal connection of the output member 96 to the hooking member 64 by pin 100.

The mounting means 110 which connects the first end portion 26 of the tongue 24 of this embodiment to the trailer 16 is slightly different than that of the preferred embodiment. The differences lie in the fact that the trailer 16 has a cutout portion 146 for receiving a portion of the hinge 114 when the tongue 24 is elevated and the socket engaging device 44 is at the second position 48 as shown in FIG. 6. The hinge 114 like that of the other embodiment is pinned to the trailer 16 by hinge pin 116 so that pivotal movement about the hinge pin may take place. As the reader may have observed, pivotal movement of the tongue 24 about hinge pine 116 will result in elevational movement of the tongue supporting member 74 in a plane. The piloting end portion 72 of the tongue supporting member 74 has a tapered portion 148 which assists in positioning the tapered portion in the pilot aperture 90 of the locating member 86. Thus, the tongue supporting member 74 may be easily moved between the surface supported position 73 and the socket engaging device supported position 75.

In this alternate embodiment, the tongue 24 extends at an angle to the underlying supporting surface 20 at the surface supported position 73 (FIG. 5) so that the socket member 30 is at a high enough elevation to be disposed between the hooking member 64 and the first flange member 40. The tongue supporting member 74 however extends from the tongue 24 in an elevational direction similar to that of the preferred embodiment downward to the underlying surface and substantially parallel to the guide path 66 defined by the first and second guide rails 128,130.

As best seen in FIG. 7, the socket member 30 has first and second tapered sides 150,152. These tapered sides 150,152, assist in guiding the tongue 24 into alignment with the socket engaging member 44 so that the socket engaging member 44 may be mated with the socket member 30. The first and second tapered sides 150,152 contact the first and second sides 34, 36 of the bracket, respectively, and force alignment through movement of the vehicle 10. It should be noted that these elements provide alignment in a manner similar to that of the tongue piloting projection 120 and tongue guiding member 122.

Industrial Applicability

With reference to the drawings, the automatic guided vehicle 12 is primarily suited for industrial transportation system applications wherein parts to be machined, stored, and/or assembled are transported within the faciity on trailers 16. At various locations within the facility the plurality of pilot apertures 90 disposed in the underlying supporting surface 20 are provided. The plurality of pilot apertures 90 define a plurality of docking locations at which the trailers 16 are deposited and/or picked up. As previously mentioned the purpose of the pilot apertures is to accurately locate the trailers 16 so that the automatic guided vehicle 10 may be dispatched to a specific docking location to acquire the trailer 16.

In operation the automatic guided vehicle 10 is dispatched to a specific docking location to acquire a specific trailer 16 to be transported. Upon arrival at the docking location the onboard computer and vehicle guidance system accurately position the end portion 38 of the vehicle 10 adjacent the towed apparatus 16. The vehicle 10 moves in a direction toward the trailer 16 so that the slot 126 in the tongue member 122 engages the tongue piloting projection 120 and guides the tongue piloting portion to a position at which the socket member 30 is disposed in hooking member receiving alignment with the hooking member 64. The socket engaging device 44, during this maneuver, is at the first position 46 so that the hooking member 64 is elevationally spaced beneath the socket member 30 and within the path 66 of elevational movement of the socket engaging device 44.

Upon completion of this alignment maneuver as determined by the tongue guiding member 122 tongue piloting projecton 120. The power means 71 which is connected to the socket engaging device 44 is actuated which causes output member 96 to move and elevationally raise the socket engaging device 44 from the first position 46, along the guide path 66, to the second position 48, at which the socket member 30 is disposed between and in contact with the hooking member 64 and the first flange member 40. At this position the tongue 24 is securely connected to the automatic guided vehicle 10.

As a result of this movement, the tongue 24 pivots about axis 112 of pivoted pin 116 in an upward direction in response to movement of the hooking member 64 from the first position 46 to the second position 48. Pivotal motion of tongue 24 in this direction causes elevational movement of the tongue supporting member 74 from the surface supported position 73 at which the piloting end portion 72 is engaged with the underlying supporting surface 20 and from being disposed in pilot aperture 90 to the socket engaging device supported position 75 at which the piloting end portion 72 is elevationally spaced from the underlying supporting surface 20 and from engagement in the pilot aperture 90. The trailer 16 is now free to be transported and free from connection to the underlying supporting surface 20 at the socket engaging device supported position 75. Once the tongue supporting member 74 is lifted in this manner the trailer 16 is towed to a preselected deposit location within the facility. It is to be noted that the deposit location may or may not have pilot apertures 90 in the supporting surface 20. The tongue supporting member 74 will serve to support the tongue 24 on the underlying surface 20 and allow disconnection and connection of the trailer 16 to and from the vehicle 10. This is possible since the distance between the underlying surface 20 and socket member 30 is within an acceptable distance range for allowing the hooking member 64 to be positioned beneath when at the first position 46.

Upon arriving at the deposit location the power means 71 is actuated and the output member 96 lowers the socket engaging device 44 along the guide path 66 from the second position 48 to the first position 46 at which the hooking member 64 is freed from connection with the socket member 30 and spaced from being disposed in the opening 76. As the socket engaging device 44 lowers the tongue 24 will follow. The piloting end portion 72 will move in response to pivotal motion of the tongue about axis 112 until the piloting end portion 72 is disposed in pilot aperture 92 and the weight of the tongue 24 is supported by the surface 20. It should be noted that in the embodiments of FIGS. 2–4 the stop member 32 supports the weight of the tongue 24 and in embodiment of FIGS. 5–7 the tapered portion 148 supports the weight of the tongue 24 on the underlying surface 20.

Thus, the hitch assembly 22 provides an apparatus and method for simultaneously connecting the trailer 16 to the vehicle 10 and releasing the trailer 16 from connection to the underlying support surface 20 in a simple, economical, and efficient manner.

Other aspects, objects and advantages of this invention can be obtained from study of the drawings, the disclosure, and the appended claims.

We claim:

1. A hitch assembly for connecting a vehicle to a towed apparatus supported on an underlying supporting surface, comprising:
    a tongue having first and second spaced apart end portions and being adapted for connection at said first end portion to one of said towed apparatus and vehicle;
    a socket member connected to the second end portion of said tongue;
    a tongue supporting member having spaced apart mounting and piloting end portions and being connected at the mounting end portion to the tongue, said tongue supporting member extending in a transverse direction relative to said tongue and being adapted to engage the underlying supporting surface;
    a bracket being mountable on the other of said vehicle and towed apparatus;
    a socket engaging device having a guide and a hooking member, said guide being connected to said bracket and defining an elevationally oriented guide path and said hooking member having a guide following portion and being connected to said guide, said hooking member being elevationally movable along said guide path between a first position, at which said socket member is free from connection with said hooking member, and a second position elevationally spaced from said first position, at which said socket member is engaged with and connected to the hooking member;
    a first flange member connected to the bracket at a location on the bracket adjacent the second position of the socket engaging device, said socket member being captured between the socket engaging device and the first flange member at the second position of the socket engaging device; and
    an actuator having a housing and an output member movably connected to the housing, said actuator housing being connected to one of the bracket and socket engaging device and said actuator output member being connected to the other of said bracket and socket engaging device, said socket engaging device being elevationally movable between said first and second positions in response to movement of said actuator output member, and said tongue being elevationally movable from a surface supported position, at which the piloting end portion of the tongue supporting member is engagable with the underlying supporting surface, to a socket engaging device supported position elevationally spaced from the surface supported position, at which the piloting end portion of the tongue supporting member is spaced from said underlying supporting surface, in response to elevational movement of the socket engaging device from the first position toward said second position.

2. A hitch assembly, as set forth in claim 1, wherein said guide includes;
    a first sleeve having a bore and being connected to the bracket at a location on the bracket adjacent the first position of the socket engaging device; and
    a second sleeve having a bore and being connected to the bracket at a location on the bracket elevationally spaced from the first sleeve and adjacent the second position of the socket engaging device; and
    a shaft disposed in the bore of said first and second sleeves and defining said guide path, said hooking member being mounted on said shaft and movably guided by one of said shaft and sleeves along said guide path.

3. A hitch assembly, as set forth in claim 2, wherein said shaft is slidably disposed in the first and second sleeve bores and including means for maintaining said shaft from rotation in said first and second bores.

4. A hitch assembly, as set forth in claim 1, including an electric motor mounted on the actuator housing and drivingly connected to the output member, said actuator output member being extensibly movable relative to said actuator housing and pivotally connected to said hooking member, said actuator housing being pivotally connected to the bracket.

5. A hitch assembly, as set forth in claim 1, including mounting means for pivotally connecting the first end portion of the tongue to the towed apparatus and maintaining said tongue for pivotal elevational movement about a first axis.

6. A hitch assembly, as set forth in claim 1, wherein said guide includes;
    a first guide rail connected to said bracket and extending in an elevationally oriented direction; and
    a second guide rail connected to the bracket and extending in a direction parallel to said first guide rail, said first and second guide rails defining said guide path.

7. A hitch assembly, as set forth in claim 6, wherein the guide following portion has first and second spaced apart notches disposed therein and opening in opposite directions, said first guide rail being disposed in said first notch and said second guide rail being disposed in said second notch.

8. A hitch assembly, as set forth in claim 7, wherein said bracket has a receiving aperture disposed therein and said hooking member has a projection, said hooking member being mounted on the rod and said projection being disposed in the receiving aperture at the second position of the socket engaging device.

9. A hitch assembly for connecting a vehicle to a towed apparatus supported on an underlying supporting surface, comprising:
    a tongue having first and second spaced apart end portions and being adapted for connection at said first end portion to one of said towed apparatus and vehicle;
    a tongue piloting projection connected to the second end portion of the tongue and extending from said tongue in a direction substantially elevationally transverse to the tongue;
    a socket member connected to the second end portion of said tongue;

a tongue supporting member having spaced apart mounting and piloting end portions and being connected at the mounting end portion to the tongue, said tongue supporting member extending in a transverse direction relative to said tongue and being adapted to engage the underlying supporting surface;

a bracket being mountable on the other of said vehicle and towed apparatus;

a socket engaging device mounted on the bracket and elevationally movable between a first position, at which said socket member is free from connection with said socket engaging device, and a second position elevationally spaced from said first position, at which said socket member is engaged with and connected to the socket engaging device;

a tongue guiding member having an end and a slot opening at said end, said tongue guiding member being mounted on said bracket and adapted to engage the tongue piloting projection at the first position of the socket engaging device, said tongue guiding projection being disposable in the tongue guiding slot, slidably engagable with the tongue guiding member, and adapted to position the socket member in elevational alignment with the socket engaging device; and an actuator having a housing and an output member movably connected to the housing, said actuator housing being connected to one of the bracket and socket engaging device and said actuator output member being connected to the other of said bracket and socket engaging device, said socket engaging device being elevationally movable between said first and second positions in response to movement of said actuator output member, and said tongue being elevationally movable from a surface supported position, at which the piloting end portion of the tongue supporting member is engagable with the underlying supporting surface, to a socket engaging device supported position elevationally spaced from the surface supported position, at which the piloting end portion of the tongue supporting member is spaced from said underlying supporting surface, in response to elevational movement of the socket engaging device from the first position toward said second position.

10. A hitch assemby, as set forth in claim 9, wherein said tongue piloting projection has a tapered end portion and said tongue guiding slot has a "V" shaped configuration.

11. A tow vehicle and trailer comprising:

a tongue having first and second end portions;

mounting means for connecting the tongue first end portion to the trailer;

a socket member having an opening and being connected to the tongue second end portion;

a tongue supporting member having a connecting end portion and a piloting end portion and being connected at the connecting end portion to the tongue and extending in a direction transverse to said tongue and downward toward an underlying supporting surface;

a vehicle frame having an end portion;

a bracket having a first flange member member and being connected to the vehicle frame end portion;

a socket engaging device having a hooking member and a guide, said guide being connected to the bracket and said hooking member being slidably connected to the guide, said guide defining a preselected elevationally oriented guide path and said hooking member being movable relative to said bracket along said guide path;

power means for moving said hooking member elevationally along said guide path between a first position, at which the hooking member is spaced a preselected elevational distance from the first flange member, and second position spaced from the first position, at which the hooking member is closely adjacent the first flange member, said tongue being elevationally moveable from a surface supported position, at which the piloting end portion is engaged with the underlying supporting surface and the hooking member is free from engagement with the socket member, to a socket engaging device supported position, at which the piloting end portion is spaced from the underlying supporting surface and the hooking member is disposed in the socket member opening, in response to elevational movement of the hooking member from the first position to the second position, said socket member being disposed between and engaged with the first flange member and hooking member at the second position of the hooking member.

12. A tow vehicle and trailer, as set forth in claim 11, wherein said power means includes;

a housing pivotally connected to said bracket;

an output member slidably connected to the housing and pivotally connected to said hooking member; and an electric motor mounted on the housing and drivingly connected to said output member, said hooking member being movable between said first and second positions in response to extensible movement of said output member.

13. A tow vehicle and trailer, as set forth in claim 11, including a second flange member mounted on said bracket at a location adjacent the first position of the hooking member and wherein said guide includes;

a shaft;

first and second sleeves each having a bore and being connected to said first and second flanges respectively, said shaft being disposed in the bore of said first sleeve and the bore of said second sleeve, said hooking member being mounted on said shaft and movably guided by said first and second sleeves and shaft along said guide path.

14. A tow vehicle and trailer, as set forth in claim 11, wherein said guide includes;

first and second spaced apart parallel elevationally oriented guide rails mounted on said bracket and defining said guide path, and said hooking member includes;

a guide following portion having first and second opposed spaced apart notches disposed therein, said first and second guide rails being disposed in the first and second notches, repsectively, and said guide following portion being movably guided along the guide rails.

15. A tow vehicle and trailer, as set forth in claim 11, wherein said mounting means includes a hinge having a hinge pin and being connected to and between the tongue first end portion and the trailer, said hinge pin having a first axis and being axially oriented in a direction substantially normal to the guide path, said tongue being pivotally movable about said hinge pin in response to elevational movement of the hooking member between said first and second positions.

16. A tow vehicle and trailer, as set forth in claim 11, including a locating member having a pilot aperture and being mounted on the underlying supporting surface, said piloting end portion of the tongue supporting member being disposable in the pilot aperture of the locating member at the surface supported position of the tongue.

17. A tow vehicle and trailer, as set forth in claim 16, including a stop member connected to the piloting end portion of the tongue, said stop member being engageable with the locating member at the surface supported position of the tongue.

18. A tow vehicle and trailer, as set forth in claim 16, wherein the piloting end portion of the tongue supporting member is tapered.

19. A tow vehicle and trailer, as set forth in claim 11, wherein said connecting end portion of the tongue supporting member is threaded and screwthreadably connected to the tongue, said tongue supporting member extending normally from said tongue.

20. A tow vehicle and trailer, as set forth in claim 13, wherein said shaft is slidably disposed in the first and second sleeve bores and including means for maintaining said shaft from rotation in said bores.

21. A tow vehicle and trailer, as set forth in claim 11, including;
- a tongue piloting projection connected to the second end portion of the tongue and extending from said tongue in a direction elevationally transverse the tongue;
- a tongue guiding member having an end and a slot opening at said end, said tongue guiding member being mounted on said bracket and adapted to engage the tongue piloting projection at the first position of the socket engaging device, said tongue piloting projection being disposable with the tongue guiding slot, slidably engageable with the tongue guiding member, and adapted to position the socket member in elevational alignment with the socket engaging device.

22. An industrial transportation system comprising:
- a driverless automatic guided computer controlled vehicle having a frame and a plurality of wheels rotatably connected to the frame and engaged with an underlying supporting surface;
- an industrial trailer having a plurality of wheels engaged with the underlying supporting surface;
- a plurality of locating members each having a pilot aperture and being connected to the underlying supporting surface at spaced apart locations thereon, said locating members defining a plurality of docking locations;
- a tongue having first and second spaced apart end portions and being connected at the first end portion to the industrial trailer;
- a socket member connected to the second end portion of the tongue;
- a tongue supporting member having a connecting end portion and a piloting end portion and being connected at the connecting end portion to the tongue at a location on the tongue between the first and second end portions, said tongue supporting member extending from said tongue in a direction downward toward the underlying supporting surface, and said piloting end portion being disposed in the pilot aperture of one of the plurality of locating members;
- a socket engaging device having a guide and being connected to the vehicle frame, said guide defining a guide path and said socket engaging device being elevationally movable along said guide path between a first position, at which said socket member is elevationally spaced above the socket engaging device and free from connection with said socket engaging device, and a second position elevatoinally spaced above said first position, at which said socket engaging device is engaged with said socket member and connected to said socket member and ;
- power means for elevationally moving said socket engaging device along said guide path and between said first and second positions, said tongue supporting member being elevationally movable in response to elevational movement of the socket engaging device, and said tongue supporting member being disposed in the pilot aperture of said one of the plurality of locating members at the first position of the socket engaging device and elevationally spaced from being disposed in the pilot aperture of said one of the plurality of locating members at the second position of the socket engaging device.

23. A method for hitching an industrial vehicle to an industrial trailer and releasing the industrial trailer from piloting connection with a locating member connected to an underlying supporting surface, including the steps of:
- positioning said industrial vehicle at a location adjacent the industrial trailer, at which a socket engaging device of the industrial vehicle is disposed at a first position elevationally beneath a socket member of the industrial trailer and within a path of elevational movement of the socket engaging device;
- actuating a power means connected to said socket engaging device and elevationally moving the socket engaging device from said first position at which the socket engaging device is free from connection with the socket member to a second position elevationally spaced from the first position at which the socket engaging device is connected to the socket member and the socket member is retained thereon by a first flange member; and
- lifting a piloting end portion of a tongue supporting member mounted on the industrial trailer from a surface supported position, at which the piloting end portion is disposed in a piloting aperture of the locating member and supported on the underlying supporting surface, to a vehicle supported position, at which the piloting end portion is free from being disposed in said piloting aperture of the locating member and elevationally spaced from said underlying supporting surface, in response to elevational movement of the socket engaging device from the first position toward the second position.

24. A hitch assembly for connecting a vehicle to a towed apparatus supported on an underlying supporting surface, comprising:
- a tongue having first and second spaced apart end portions and being adapted for connection at said first end portion to said towed apparatus;
- a socket member connected to the second end portion of said tongue;
- a tongue supporting member having spaced apart mounting and piloting end portions and being connected at the mounting end portion to the tongue, said tongue supporting member extending in a transverse direction relative to said tongue and being adapted to engage the underlying supporting surface;

a socket engaging device having a guide and a hooking member, said guide being adapted for connection to said vehicle and defining an elevationally oriented guide path, said hooking member haivng a guide following portion and being connected to said guide, said hooking member being elevationally movable along said guide path between a first position, at which said socket member is free from connection with said hooking member, and a second position elevationally spaced from said first position, at which said socket member is engaged with and connected to the hooking member;

a first flange member connected to said vehicle at a location of the vehicle adjacent the second position of the socket engaging device, said socket member being captured between the socket engaging device and the first flange member at the second position of the socket engaging device; and an actuator having a movable output member connected to the socket engaging device, said socket engaging device being elevationally movable between said first and second positions in response to movement of said actuator output member, said tongue being elevationally movable from a surface supported position, at which the piloting end portion of the tongue supporting member is engagable with the underlying supporting surface, to a socket engaging device supported position, at which the piloting end portion of the tongue supporting member is spaced from said underlying supporting surface, in response to elevational movement of the socket engaging device from the first position toward said second position.

* * * * *